(12) United States Patent
Van Der Meulen et al.

(10) Patent No.: US 6,970,176 B1
(45) Date of Patent: Nov. 29, 2005

(54) VIDEO PROCESSING IN PC USES STATISTICALLY TUNED COLOR CUBE

(76) Inventors: Pieter Sierd Van Der Meulen, 753 W. Knickerbocker Dr., Sunnyvale, CA (US) 94087; Fransiscus Wilhelmus Sijstermans, Groenewoudseweg 1, Eindhoven (NL), 5621 BA ( * ) Notice: Subject to any disclaimer, the term of this patent is extended or adjusted under 35 U.S.C. 154(b) by 1011 days.

(21) Appl. No.: 09/102,950

(22) Filed: Jun. 23, 1998

(51) Int. Cl.$^7$ .............................................. G09G 5/02
(52) U.S. Cl. ............................... 345/593; 345/605
(58) Field of Search ......................... 345/150, 155, 345/435, 593, 589, 605; 382/166, 232, 162, 167

(56) References Cited

U.S. PATENT DOCUMENTS

| | | | |
|---|---|---|---|
| 4,667,228 A | 5/1987 | Kawamura et al. ......... 358/519 |
| 4,700,399 A * | 10/1987 | Yoshida ..................... 382/167 |
| 4,941,193 A * | 7/1990 | Barnsley et al. ............ 382/249 |
| 5,028,999 A | 7/1991 | Vogel ........................ 348/419 |
| 5,227,863 A * | 7/1993 | Bilbrey et al. ............. 348/578 |
| 5,444,835 A * | 8/1995 | Turkowski .................. 345/435 |
| 5,530,481 A | 6/1996 | De With et al. ............ 348/415 |
| 5,561,465 A | 10/1996 | Fautier et al. .............. 348/415 |
| 5,566,208 A | 10/1996 | Balakrishnan .............. 375/240 |
| 5,583,666 A * | 12/1996 | Ellson et al. ............... 358/518 |
| 5,606,369 A | 2/1997 | Keesman et al. ........... 348/385 |
| 5,606,371 A | 2/1997 | Klein Gunnewiek et al. ........................ 348/405 |
| 5,619,267 A | 4/1997 | Riegel et al. ............... 348/400 |
| 5,734,368 A * | 3/1998 | Meyers et al. .............. 345/155 |
| 5,734,443 A | 3/1998 | O'Grady .................... 348/705 |
| 5,751,292 A * | 5/1998 | Emmot ...................... 345/430 |
| 5,790,708 A * | 8/1998 | Delean ...................... 382/276 |
| 5,822,452 A * | 10/1998 | Tarolli et al. ............... 382/166 |
| 5,930,390 A * | 7/1999 | Coelho ...................... 382/168 |
| 5,982,937 A * | 11/1999 | Accad ....................... 382/239 |
| 5,986,671 A * | 11/1999 | Fredlund et al. ............ 345/435 |

* cited by examiner

*Primary Examiner*—Jeffery Brier
*Assistant Examiner*—Ryan Yang

(57) ABSTRACT

Video is processed based on the color content of a video frame. A frame-specific or sequence-specific color cube is created in order to efficiently use the available bandwidth, and to efficiently carry out conventional video operations. The color cube is a statistically tuned subset of the original color space.

3 Claims, 3 Drawing Sheets

VIDEO PROCESSING IN PC USES STATISTICALLY TUNED COLOR CUBE

FIELD OF THE INVENTION

The invention relates to a method and a system for processing an image, e.g., video (de-) compression. The invention relates in particular, but not exclusively, to a method of enabling a PC to process video without extensive support of expensive hardware. The invention also relates to still image bit-depth reduction methods.

BACKGROUND ART

A problem associated with the digital processing of color pictures is that there is only a finite number of bits available to digitally represent the actual colors in the picture. Choosing an RGB representation of 8 bits for each of R, G and B, provides a three-dimensional uniform grid of 256×256×256 colors. The true color of a pixel is to be mapped onto this discrete set, e.g., according to a nearest neighbor mapping. This quantization introduces minor deviations, but the 24-bit representation requires massive processing capabilities. It gets more difficult for graphics display hardware that does not have the 24-bit processing capability. Typical graphics display hardware supports only 8 bits of storage per pixel. Accordingly, the set of 256×256×256 colors is to be mapped onto the substantially smaller color subset of 256 colors, which introduces yet another error. The 8 bits are now associated with an index between 0 and 255. So, instead of using 3 bytes per pixel (256×256×256), only a single byte per pixel is sent from the CPU to the graphics hardware. In order to assure that it displays correctly on an RGB monitor, the graphics hardware also stores a Color Look Up Table (CLUT) that maps 256 indices back to combinations of R, G and B intensities. The calculation of such a CLUT and the mapping of the set of 256×256×256 original colors to the 256 color subset can be very time consuming.

It is known to map an image onto a reduced set by choosing the 256 most prominent colors present in the image. Each of these colors is defined by a triplet, (R, G, B) for example, of integers between 0 and 255, which determines the coordinates of the color in the original color cube. For each color, the number of pixels having that color is determined and the colors having the 256 highest numbers are chosen to represent the image. The reduced set is represented by a collection of indices to a CLUT. This approach has some disadvantages. The transformation of the original frame to a frame represented in this reduced color subset requires an elaborate closest-color search. Furthermore, the transformed frame consists of an array of indices for the colors. These indices are merely labels and the array relates to the original color cube only indirectly. Therefore, video operations are, in general, not possible in the color domain represented as a indices. In addition, this method is highly time consuming. For movies/video, i.e., a sequence of rapidly succeeding images the method requires a new CLUT for each movie frame. It often takes longer to install the new CLUT than to display the new frame in the time available (e.g., 33 msec for NTSC video). Even if the CPU is capable of timely sending a new CLUT to the graphics hardware, this method may cause color flashing. That is, pixels that in a sequence of original frames conserve their color, may now appear to have fluctuating colors.

Another manner to map the image onto a reduced color set is to use a color cube similar to, but smaller than, the original cube of 256×256×256 colors. For example, eight red, eight green and four blue intensities are chosen in an 8×8×4 sub-space to create 256 colors. The intensities are fixed so that they cover the whole range of each color dimension by spacing them equidistantly. In the above example, the red and green intensities would each be (16, 48, 80, 112, 114, 176, 208, 240) and the blue intensities (32, 96, 160, 224). As known, the human eye is less sensitive to variations in the color blue than to those in green or red. The advantage of this method is that the conversion from the original color cube to the reduced one is simple. The original bytes are simply truncated. Furthermore, processing in the reduced domain is possible using an appropriate indexing scheme. In above example, the first three bits of an 8-bit index typically represents the red intensities, the second triplet of bits the green intensities, and the last two bits the blue intensities. Index 001 100 11 in the transformed domain corresponds then to (48, 144, 224) in the original domain. The disadvantage of the use of this color cube method is that visual quality of the picture deteriorates considerably due to the coarse quantization. Especially, subtle colors such as pastel tones and facial tints are hard to represent using this scheme, even if dithering techniques are used to spread the errors.

OBJECT OF THE INVENTION

It is an object of the invention to provide a method of processing an image that mitigates the quality deterioration of the color cube approach explained above.

SUMMARY OF THE INVENTION

To this end, the invention provides a method of processing an image comprised of pixels. A color of a respective one of the pixels is represented by a respective point of a grid of points in a multiple-dimensional color space. This space is spanned by respective axes of respective color components. The space is an RGB or a YUV space. According to the processing in the invention, for each respective axis a respective range is determined representative of the respective color component in the image. A subset is selected of the points of the grid within a region determined by the respective ranges. The image is then mapped onto this subset.

The inventors thus suggest that a statistically tuned color cube be used. A range for a specific color component, say the R component, is determined, for example, by identifying the extreme values of this component occurring in the image. Alternatively, pixel locations are selected at random in the original image or throughout the frames of a sequence. The colors of the pixels thus selected define ranges that are to be covered by the subset. Other methods for selecting the ranges based on color content can be used. The method of the invention uses a grid but the points of the subset need not cover the whole intensity range, nor do they have to be equidistant. A color cube that properly represents, for example, subtle colors and bright red could be defined by intensities (70, 100, 120, 130, 140, 160, 200, 240) for red, (70, 90, 110, 120, 130, 140, 150, 160, 180) for green, and (90, 115, 135, 160) for blue. Since the method uses a color cube representation, the advantages of this approach as discussed above remain largely preserved. For example, the transformation from the original 256×256×256 color cube to the reduced, statistically tuned color cube remains simple. Further, all video operations can still be performed on the transformed frames. Some operations may, however, become somewhat more complex due to the fact that the intensities are not equidistant. An additional advantage is that for a movie a sequence of many frames can use the same color cube. As a result, a new CLUT needs to be transferred only once is a while, typically at a scene cut, instead of for each frame individually.

Without loss of processing performance, the RGB color space can be converted to a different color space, such as YUV. For YUV, a 16×4×4 color cube created according to the invention works particularly well. A standard CLUT in the display device can perform both the inverse transformation from YUV to RGB and from the reduced color cube to the original color cube. This does not require any additional computational resources, since a color table look-up action is performed by the graphics hardware at display refresh rate anyway.

Above examples address the transformation from a 256×256×256 color cube to an 8×8×4 color cube, i.e., from 24-bit colors to 8-bit colors. It is clear that the sizes of the color cubes do not affect above arguments. For example, 8×8×8 RGB color cubes or 32×4×4 YUV color cubes requiring 9 bits per pixel would also work well. Also, 32×64×32 RGB statistically tuned color cubes can be used for 16-bit buffers.

As with the traditional image processing methods, dithering may be used to improve the overall visual impression even more. As known, dithering is a technique of interleaving dark and light pixels or pixels of different colors so that the resulting image appears to be smoothly shaded when viewed from a distance.

Another aspect of the invention relates to a method of enabling the processing of an image comprised of pixels by providing the statistically tuned color cube. A respective color of a respective one of the pixels is represented by a respective one of a plurality of points of a grid in a multiple-dimensional color space spanned by respective axes of respective color components. The enabling comprises determining for each respective axis a respective range representative of the respective color component in the image, and selecting a subset of the points of the grid within a region determined by the respective ranges.

BRIEF DESCRIPTION OF THE FIGURES

The invention is explained in further detail and by way of example with reference to the accompanying drawing wherein.

Similar or corresponding features are indicated by same reference numerals throughout the figures.

PREFERRED EMBODIMENTS

First flow diagram

Figure 1:
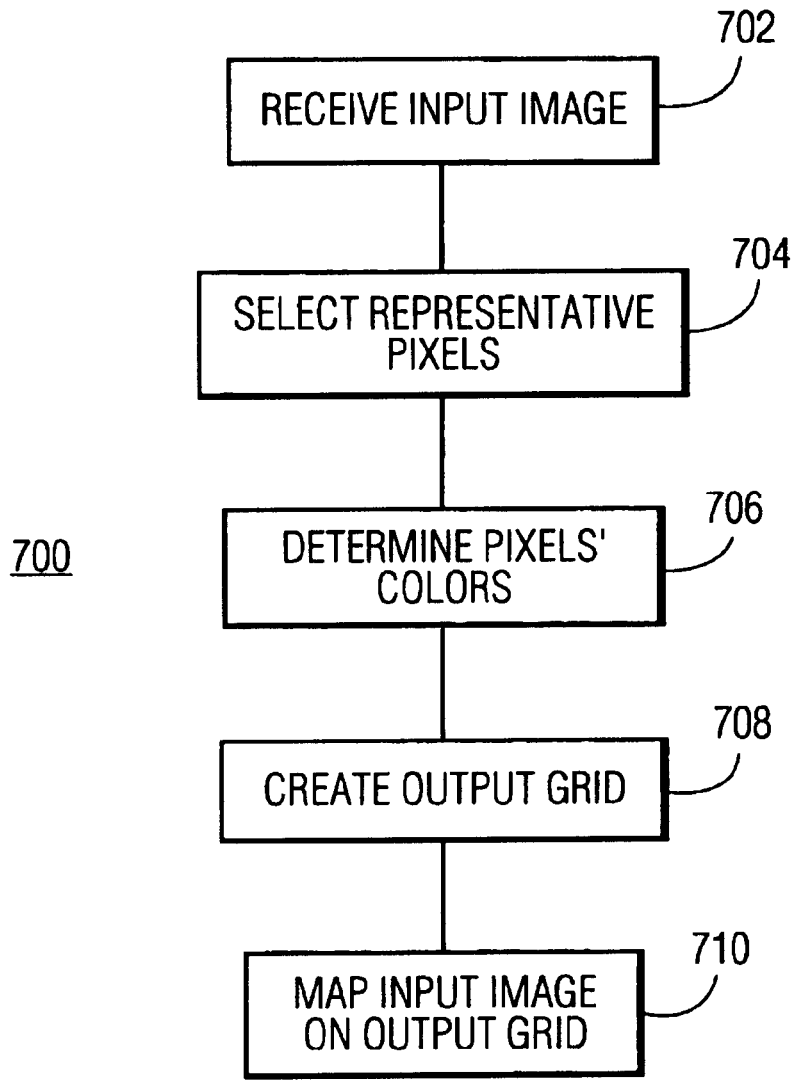
FIGS. 1 and 3 are flow diagrams illustrating methods of the invention.

FIG. 1 is a flow diagram 700 illustrating an example of a method according to the invention. An input image or a sequence of input images is received in step 702. The input colors of the input image or of the sequence are encoded in an RGB format in this example. In this format, each color is defined by its location in in a three-dimensional input grid spanned by the set of discrete-positions along the R-axis, G-axis and B-axis. It is assumed in this example that the input grid forms a 256×256×256 color cube. In step 704 a number of pixels is selected from the input image or from the sequence according to a predetermined procedure in order to serve as representatives for determining the color content of the input image as a whole. The pixels are selected, for example, randomly or so that there are more representative pixels selected from an area at the geometric center of the image than from near the perimeter of the image. Alternatively, the most significant colors are determined on the basis of a color histogram per frame or per sequence of frames. Other selection criteria can be used. In step 706, the color content of the representative pixels is determined. In step 708, an output grid, i.e., the statistically determined color cube, is created as a subset of the original grid as based on the colors determined in step 706. The points of the output grid do not have to cover the whole intensity range of the input grid nor do they have to be equidistant, as discussed above. Note that the output grid's points form a smaller color cube being a subset of a larger grid that is the original color cube having points with coordinates from 0 to 255 in steps of unity along its axes.

The output grid can be created on the basis of the representative pixels in a variety of ways. Each of the color components (red, green and blue) of the representative pixels is represented as number in a digital format. The color components can therefore be ranked according to magnitude. For an interval where the numbers are clustered one could select an associated region of the color space with a correspondingly higher density of points of the output grid near the region's center than near its boundary. Alternatively, one could truncate the digital numbers in the input grid and select these points for the output grid. Still another method is to find the extremes for the clusters of each color component present in the set of representative pixels and select a distribution of points in the output grid corresponding to the clusters.

In step 710, the input image or each input image of the initial sequence is mapped onto the output grid. That is, the pixels of the input image get their colors assigned from the output grid, i.e., the statistically tuned color cube. This is achieved, for example, by truncating each of the original R, G and B components to the nearest point of the output grid, which is a simple operation. Note that the output grid thus determined is a subset of the original color cube, so that the advantages of the RGB representation also remain largely preserved. E.g., all video operations can still be performed on the transformed images.

The creation of the output color grid is part of the pre-processing in the PC. The output color grid is then loaded into the RAMDAC by the local CPU to perform its conventional function.

First Block Diagram

Figure 2:
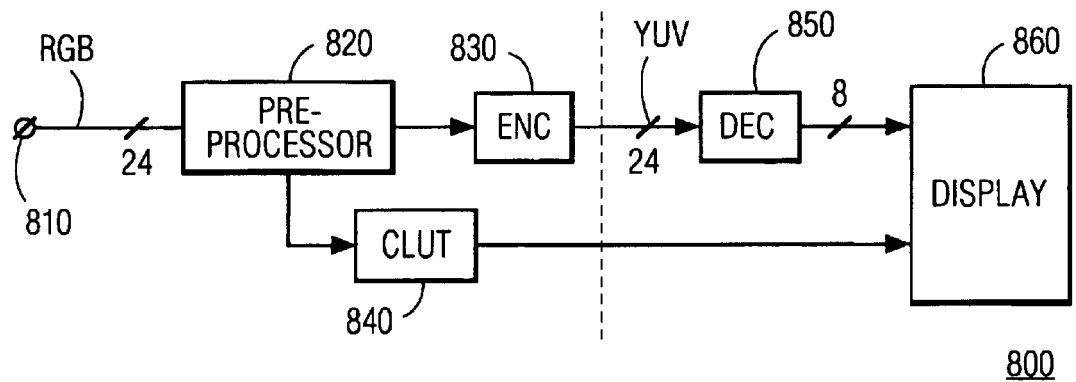
FIGS. 2 and 4 are block diagrams of systems according to the invention.

FIG. 2 is a block diagram with the main components of a system 800 according to the invention. System 800 comprises an input 810, a preprocessor 820, an encoder 830, a decoder 840, a graphics card and a display 860. Typically, components 850 and 860 are parts of a PC, and components 810–840 belong to, e.g., a contents creator. Preprocessor 820 receives RGB video data from input 810. Preprocessor 820 creates a customized CLUT for each frame or for each sequence of frames to be used at the display side. Encoder 830 encodes the RGB input data into YUV data, typically 24-bits wide. Encoder 830 in this example applies a lossy video compression scheme (e.g., JPEG, MPEG/H.263 or a subband coding technique) to the YUV data. Decoder 850 receives the 24-bits YUV data and provides output data, typically 8 bit wide as most displays have an 8-bit capacity. CLUT 840 controls the conversion of the output data into true color data for display 860. Video processing in encoder 830 and decoder 840 may remain unaware of any preprocessing if an output grid is used with equidistant points to cover the intensity range. Otherwise, encoder 830 and decoder 840 may need to be adaptive, e.g. with respect to internal filters, to remain color-correct.

Preprocessor 820 creates a CLUT on the basis of the color contents of an input picture as explained with respect to FIG. 1. The colors of the particular input pixels define a range of colors that should be covered by the subset as best approximation. It may happen that the randomly chosen colors seem to be concentrated in specific disjoint areas in the color map. Then, it is best to choose the subset of colors to be more dense in these areas than outside these areas. Note that the subset need not be composed of equidistant samples.

The YUV format represents the intensity (Y), and differential blue (U) and differential red components (V) of the desired color. As known, the human eye is more sensitive to the Y-component than to the U and V components. Accordingly, the Y component is preferably encoded into more bits than the U and V components to create a convincing picture. The invention is especially suitable for use in a PC or home theater with a DVD or CD-ROM drive. For example, games may be provided with a real video background. As the subset of colors need not be covering the entire range available for the display, the complement of the subset may be used for the graphics part of the game. That is, a compound image is created by combining the pixels of the video image with the pixels of a graphics image. A specific color is assigned to a particular one of the graphics pixels, the specific color being selected from a complement of the output grid. In this manner, a PC can do video and games without additional hardware.

Second Flow Diagram

Figure 3:
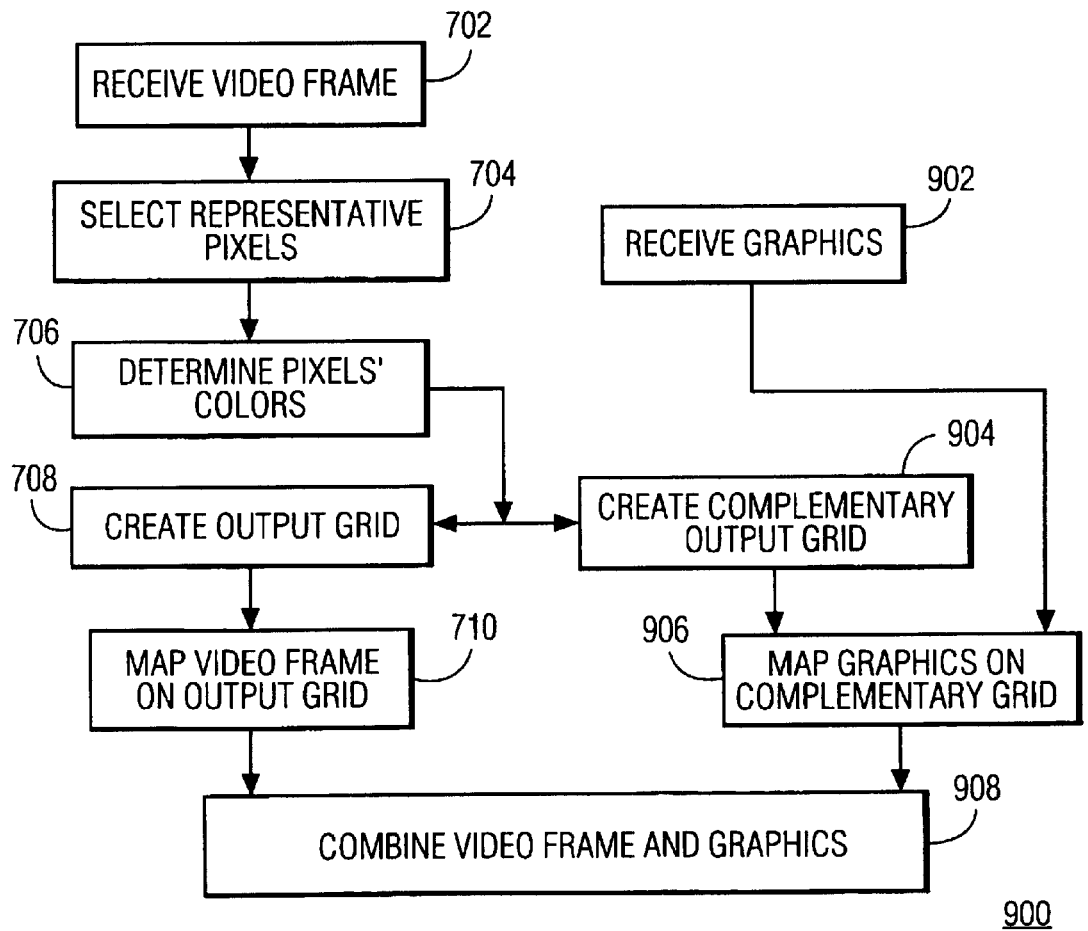

FIG. 3 illustrates the latter process in a flow diagram 900, wherein step 702 is the receiving of a video frame. Diagram 900 adds the following steps to those of diagram 700. In step 902 a graphics image is received. In step 904, the logic complement of the output grid determined in step 708 is specified. The complement is, for example, the color space capable of being covered by display 860 minus the colors of the output grid created in step 708. Now, the graphics received in step 902 is mapped onto this complementary grid in step 906. Thereupon, the graphics and video frame thus processed are combined in a single image in step 908.

Second Block Diagram

Figure 4:
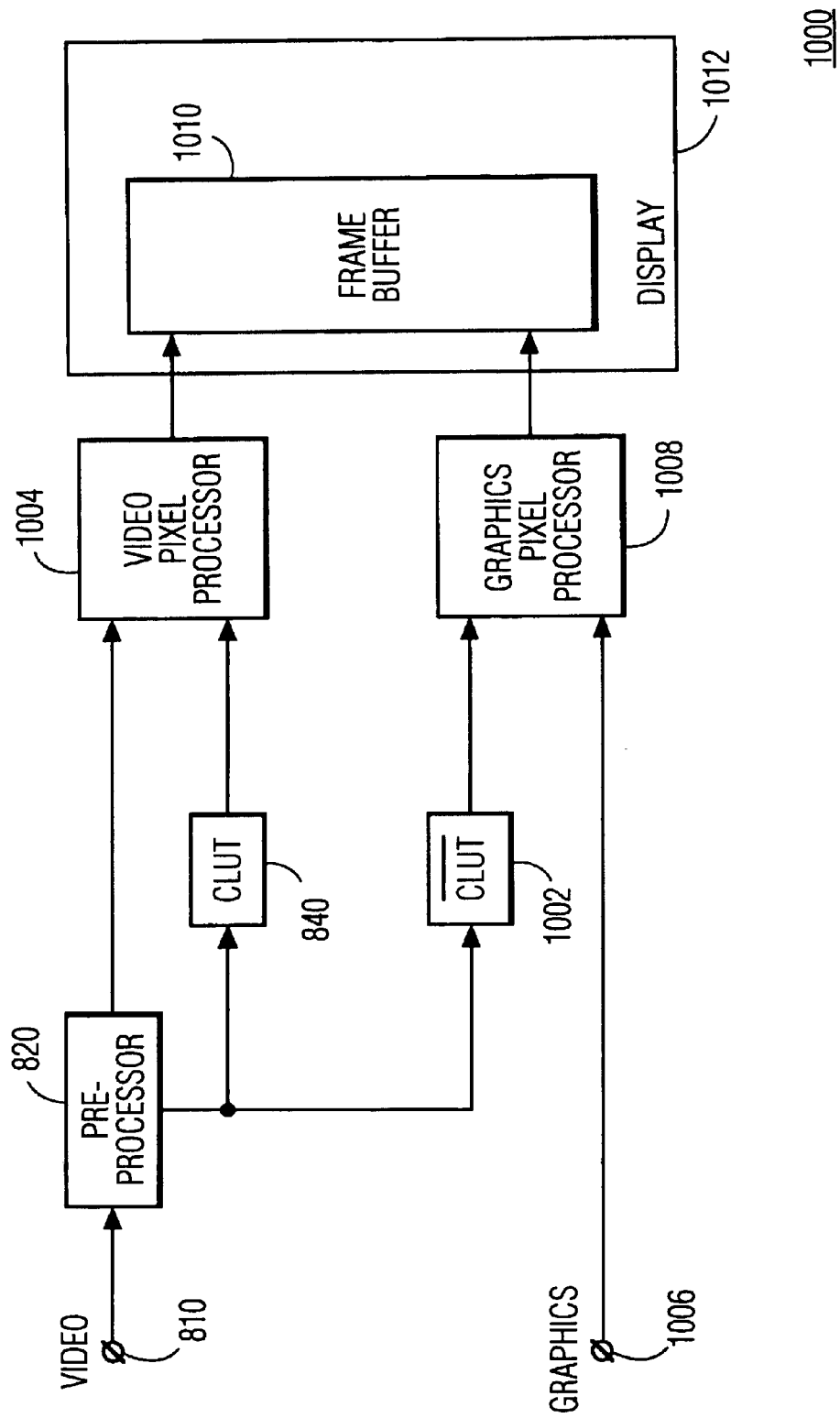

FIG. 4 is a second block diagram with main components of a system 1000 according to the invention. System 1000 implements the method described with reference to FIG. 3.

System 1000 comprises input 810 for receiving video pixels. Preprocessor 820 creates CLUT 840 that represents the customized output grid as explained above. At the same time a complementary CLUT 1002 is created to represent the complement of the output grid of CLUT 840. System 1000 comprises a processor 1004 to assign a respective color of CLUT 840 to a respective video pixel. System 1000 further comprises an input 1006 for receiving graphics data, and a processor 1008 to assign a respective color of complementary CLUT 1002 to a graphics pixel. Outputs of processors 1004 and 1008 are coupled to a frame buffer 1010 in display device 1012 to write both video and graphics pixels into buffer 1010.

We claim:

1. A method of processing an image comprised of pixels, wherein a respective input color of a respective one of the pixels is represented by a respective one of a plurality of points of a grid in a multiple-dimensional color space spanned by respective axes of respective color components the method of processing comprising the steps:
  determining for each respective axis a respective range representative of the respective color component in the image;
  selecting a subset of the points of the grid within a region determined by the respective ranges; and
  mapping the image onto the subset, wherein the method of processing further comprises the steps:
  creating a compound image by combining the pixels of the image with further pixels of a second image; and
  assigning to a particular one of the further pixels a specific color selected from a complement of the output grid.

2. The method as claimed in claim 1, wherein the selecting step comprises:
  choosing the points of the subset so that the points have a non-uniform distribution over at least one of the ranges.

3. An image processing system comprising:
  an input for receiving pixels, wherein a respective input color of a respective one of the pixels is represented by a respective one of a plurality of points of a grid in a multiple-dimensional color space spanned by respective axes of respective color components; and
  a processor connected to the input for creating a CLUT, the processor being operative to:
  determine for each respective axis a respective range representative of the respective color component in the image, and
  select a subset of the points of the grid within a region determined by the respective ranges, wherein said system further comprises:
  a second input for receiving further pixels; and
  a second processor connected to the second input and coupled to the first-mentioned processor for assigning a respective color of a complement of the output grid to a respective one of the further pixels.

* * * * *